US008623672B2

(12) United States Patent
Norman et al.

(10) Patent No.: US 8,623,672 B2
(45) Date of Patent: Jan. 7, 2014

(54) PREDICTION AND SCHEDULING SERVER

(75) Inventors: David Everton Norman, Bountiful, UT (US); Alan George Howells, Wokingham (GB); Tae Young Ahn, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 334 days.

(21) Appl. No.: 13/028,004

(22) Filed: Feb. 15, 2011

(65) Prior Publication Data

US 2011/0208337 A1 Aug. 25, 2011

Related U.S. Application Data

(60) Provisional application No. 61/306,417, filed on Feb. 19, 2010.

(51) Int. Cl.
*G06F 19/00* (2011.01)
(52) U.S. Cl.
USPC ............................................ 438/14; 700/121
(58) Field of Classification Search
USPC ...................... 438/14; 700/121, 97
See application file for complete search history.

(56) References Cited

U.S. PATENT DOCUMENTS

| | | | | |
|---|---|---|---|---|
| 5,311,562 | A * | 5/1994 | Palusamy et al. | 376/215 |
| 6,434,440 | B1 * | 8/2002 | Teranishi et al. | 700/97 |
| 6,556,884 | B1 | 4/2003 | Miller et al. | |
| 6,609,101 | B1 | 8/2003 | Landvater | |
| 6,876,894 | B1 * | 4/2005 | Chen et al. | 700/100 |
| 7,020,594 | B1 * | 3/2006 | Chacon | 703/6 |
| 7,144,297 | B2 | 12/2006 | Lin et al. | |
| 7,181,305 | B2 * | 2/2007 | Chao et al. | 700/100 |
| 7,233,834 | B2 | 6/2007 | McDoonald et al. | |
| 7,552,066 | B1 | 6/2009 | Landvater | |
| 7,894,926 | B2 * | 2/2011 | Lacaille | 700/121 |
| 7,908,127 | B2 * | 3/2011 | Weigang et al. | 703/6 |
| 2002/0082893 | A1 | 6/2002 | Barts et al. | |
| 2002/0184355 | A1 * | 12/2002 | Deats | 709/223 |
| 2003/0144897 | A1 | 7/2003 | Burruss et al. | |
| 2003/0171851 | A1 | 9/2003 | Brickfield et al. | |

(Continued)

FOREIGN PATENT DOCUMENTS

KR 2001-0008679 2/2001

OTHER PUBLICATIONS

International Search Report for PCT/US2011/025059 (P078PCT) mailed Sep. 30, 2011, 3 pages.

(Continued)

*Primary Examiner* — Kidest Bahta
(74) *Attorney, Agent, or Firm* — Blakely, Sokoloff, Taylor & Zafman LLP

(57) ABSTRACT

A server creates a plurality of projects pertaining to providing manufacturing service results. Each of the plurality of projects specifies operations to be performed relating to providing the manufacturing service results and at least one of the plurality of projects generates a requested manufacturing service result. The server initiates the at least one project that generates the requested manufacturing service result, wherein the at least one project is associated with an execution engine. The initiation of the at least one project may include sending input data to the execution engine based on configuration data that is associated with the execution engine, and obtaining the requested manufacturing service result from the execution engine. The server provides the requested manufacturing server result to at least one recipient.

22 Claims, 10 Drawing Sheets

(56) References Cited

U.S. PATENT DOCUMENTS

| | | |
|---|---|---|
| 2004/0015381 A1 | 1/2004 | Johnson et al. |
| 2004/0039597 A1 | 2/2004 | Barts et al. |
| 2004/0054554 A1 | 3/2004 | Barts et al. |
| 2004/0073448 A1 | 4/2004 | Barts et al. |
| 2004/0107111 A1 | 6/2004 | Barts et al. |
| 2004/0210426 A1 | 10/2004 | Wood |
| 2004/0267395 A1 | 12/2004 | Discenzo et al. |
| 2005/0015491 A1 | 1/2005 | Koeppel |
| 2005/0038571 A1 | 2/2005 | Brickfield et al. |
| 2005/0286764 A1 | 12/2005 | Mittal et al. |
| 2006/0026175 A1 | 2/2006 | Aggarwal |
| 2006/0189009 A1 | 8/2006 | Ahn et al. |
| 2007/0288414 A1 | 12/2007 | Barajas et al. |
| 2007/0294617 A1 | 12/2007 | Kroeger |
| 2008/0086358 A1 | 4/2008 | Doshi et al. |
| 2008/0275586 A1 | 11/2008 | Ko et al. |
| 2009/0037013 A1 | 2/2009 | Hendler et al. |
| 2009/0106178 A1 | 4/2009 | Chu |
| 2009/0118842 A1* | 5/2009 | Norman et al. ................. 700/44 |
| 2009/0119144 A1 | 5/2009 | Goyal et al. |
| 2009/0119669 A1 | 5/2009 | Norman et al. |
| 2009/0228129 A1* | 9/2009 | Moyne et al. ................. 700/102 |
| 2009/0327037 A1 | 12/2009 | Ng et al. |
| 2010/0138264 A1 | 6/2010 | Faris et al. |
| 2010/0306031 A1 | 12/2010 | McCauley et al. |

OTHER PUBLICATIONS

"Innovations that Drive Efficiency and Extendibility", Nanochip Fab Solutions, Applied Materials, Inc., vol. 4, Issue 21(2009), 16 pages.
Written Opinion for PCT/US2011/025059 (P078PCT) mailed Sep. 30, 2011, 4 pages.
International Preliminary Report on Patentability for PCT/US2011/025059.(P078PCT) mailed Aug. 30, 2012, 5 pages.

* cited by examiner

US 8,623,672 B2

PREDICTION AND SCHEDULING SERVER

RELATED APPLICATION

The present application claims priority to U.S. Provisional Application Ser. No. 61/306,417, filed Feb. 19, 2010, which is incorporated herein in its entirety.

FIELD

Embodiments of the present invention relate generally to managing a manufacturing facility, and more particularly to managing services, such as prediction services and scheduling services, in a manufacturing facility.

BACKGROUND

In an industrial manufacturing environment, accurate control of the manufacturing process is important to increase the efficiency of the factory, e.g., decrease cycle time, increase throughput, and improve equipment utilization. Ineffective process control can lead to the manufacture of products that missed due dates, fail to meet desired yield and quality levels, and can significantly increase costs due to increased raw material usage, labor costs, and the like.

When managing a manufacturing facility, complicated decisions need to be made about what operations should be performed and the order of these operations. In order to generate a schedule for a manufacturing facility, significant amounts of data must be collected from one or more software systems in the facility. The data from the systems must be transformed and manipulated from the external system's format into a format suitable for use by the scheduling engine. Current Computer Integrated Manufacturing (CIM) systems perform these transformations and manipulations using one or more programming languages that makes designing these operations difficult and time-consuming and requires specialized programming knowledge.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Embodiments of the invention are directed to a method and system for managing services, such as prediction and scheduling services, and facilitating user-specified configuration of the services in a manufacturing facility. A server creates a plurality of projects pertaining to providing manufacturing service results. Each of the plurality of projects specifies operations to be performed relating to providing the manufacturing service results and at least one of the plurality of projects generates a requested manufacturing service result. The server initiates the at least one project that generates the requested manufacturing service result, wherein the at least one project is associated with an execution engine. The initiation of the at least one project may include sending input data to the execution engine based on configuration data that is associated with the execution engine, and obtaining the requested manufacturing service result from the execution engine. The server provides the requested manufacturing server result to at least one recipient. For example, the server can store the manufacturing service results in a data store and external entities can request the stored manufacturing service results. In another example, the server can send the results to one or more recipients as specified by the project properties.

Embodiments of the present invention enable a user to configure and manage manufacturing services, such as prediction and scheduling services. A user can use a single management user interface to configure what data is needed to generate a prediction and to produce a schedule, how to manipulate the data to allow an execution engine to process the data, when to generate a prediction and a schedule, and when to provide the predictions and the schedules to a recipient.

Figure 1:
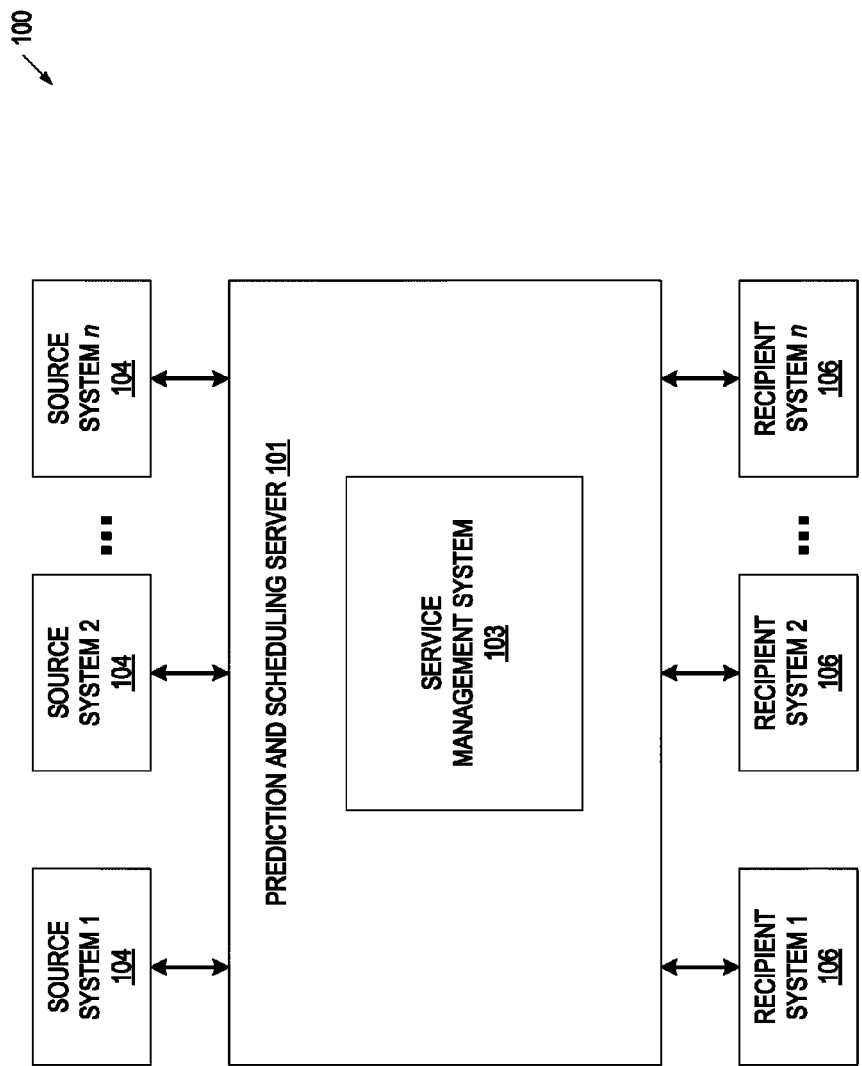
FIG. 1 illustrates an exemplary network architecture in which embodiments of the invention may operate.

FIG. 1 illustrates an exemplary network architecture 100 in which embodiments of the present invention may operate. The network architecture 100 may represent a manufacturing facility (e.g., a semiconductor fabrication facility) and may include one or more servers that provide manufacturing service results (e.g., predictions, schedules), such as a prediction and scheduling server 101, a set of source systems 104, and a set of recipient systems 106. A server 101 can be hosted by any type of computing device including server computers, gateway computers, desktop computers, laptop computers, hand-held computers or similar computing device. An exemplary computing device is described in greater detail below in conjunction with FIG. 9. The prediction and scheduling server 101 may be hosted by one or more computers with one or more internal or external storage devices.

The prediction and scheduling server 101 may communicate with the source systems 104 and the recipient systems 106 via a network (not shown). The network may be a public network (e.g., Internet) or a private network (e.g., local area network (LAN)). Two or more of the facility systems (e.g., source systems 104) may exist on the same machine and not communicate over the network, as they may use other communication protocols like shared memory, or operating system assisted facilities.

The prediction and scheduling server 101 can manage data collection, data analysis, and data publishing for providing different manufacturing services, such as prediction services and scheduling services. For example, the server 101 can build and publish predictions about the future state of a manufacturing facility and its components. The predictions generated by the prediction and scheduling server 101 may specify, for example, a future state of the equipment in the manufacturing facility, the quantity and composition of the product that will be manufactured in the facility, the state of the operators (e.g., their location, whether they are working or idle), the estimated time a product will finish a given operation and/or be available for processing at a given step, the estimated time a preventative maintenance operation should be performed on equipment, etc. In another example, the prediction and scheduling server 101 can build and publish a schedule for the manufacturing facility and its components. The schedule generated by the prediction and scheduling server 101 may specify, for example, what pieces of equipment should be used at specified times, the quantity and composition of the product that should be used by these pieces of equipment at the specified times, what the operators should do, when and where products, tools, and fixtures should be transported, etc.

The prediction and scheduling server 101 can collect data from the source systems 104 and use the collected data to provide manufacturing service results (e.g., predictions and schedules). Exemplary source systems 104 can include various systems of the manufacturing facility such as a manufacturing execution system (MES), a maintenance management system (MMS), a material control system (MCS), an equipment control system (ECS), an inventory control system (ICS), a prediction system, a computer integrated manufacturing system (CIM), various databases (including but not limited to flat-file storage systems such as Excel files), etc. The data collected from the source systems 104 may include static data (e.g., equipment used by a source system, capability of different pieces of the equipment, etc.) and dynamic data (e.g., current equipment state, products being currently processed by equipment of a source system, the product characteristics, etc.).

The prediction and scheduling server 101 can include a service management system 103 to configure and manage the execution of data collection, data processing, and data publishing for providing the manufacturing service results. In particular, the service management system 103 allows a user to customize services (e.g., prediction service, scheduling service) for the needs of a specific manufacturing facility. The service management system 103 can configure and manage services using "projects." A project can specify one or more operations to be performed in relation to providing the manufacturing service results. The service management system 103 can configure and manage one or more projects, each of which represents a phase of generating a manufacturing service result (e.g., prediction, schedule).

For example, one or more recipient systems 106 request a manufacturing schedule for the manufacturing facility and the service management system 103 can configure and manage one or more projects including data collection projects, a prediction project, and a scheduling project for providing the schedule. The data collection projects can collect data from the source systems 104 and the prediction project can use the data collected by the data collection projects to generate a prediction of the state of the manufacturing facility. The scheduling project can use the data collected by the data collection projects and the prediction generated by the prediction project to generate the requested manufacturing schedule. The service management system 103 can provide the requested manufacturing service result (e.g., the manufacturing schedule) to one or more recipient systems 106. The recipient systems 106 may include some or all of the source systems 104, as well as some other systems such as a scheduler, a dispatcher, etc.

The service management system 103 can manage multiple service projects. For example, the service management system 103 can manage multiple scheduling projects and/or multiple prediction projects. For instance, if there are multiple areas in a manufacturing facility, the service management system 103 can provide a separate schedule for each area. In this example, there would be one scheduling project per area, all of which can share the same prediction data generated from a prediction project. Alternatively, there can be one schedule project and one prediction project per manufacturing facility area.

Figure 2:
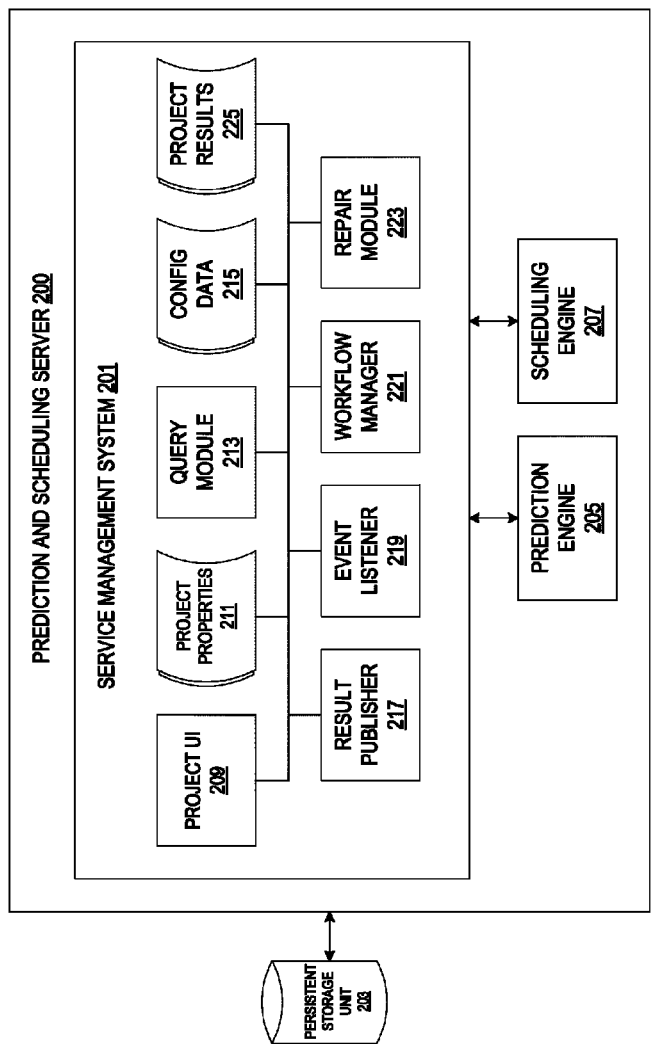
FIG. 2 is a block diagram of one embodiment of a prediction and scheduling server.

FIG. 2 is a block diagram of one embodiment of a prediction and scheduling server 200. The prediction and scheduling server 200 can be the same as the prediction and scheduling server 101 of FIG. 1. In one embodiment, the server 200 includes a service management system 201 and one or more execution engines (e.g., prediction engine 205, schedule engine 207). The service management system 201 can be the same as the service management system 103 hosted by a server 101 of FIG. 1. The server 200 can be coupled to one or more persistent storage units 203. A persistent storage unit 203 can be a local storage unit or a remote storage unit. Persistent storage units can be a magnetic storage unit, optical storage unit, solid state storage unit or similar storage unit. Persistent storage units can be a monolithic device or a distributed set of devices. A 'set,' as used herein, refers to any positive whole number of items.

A project can be a particular type of project. Examples of project types can include, and are not limited to, a shared project and a service project. Examples of a service project can include, and are not limited to, a prediction project, and a scheduling project. A shared project is a project that collects data and provides the data to other projects. Other project types, such as a service project, can receive input data and can perform calculations on the input data to produce result data. For example, a scheduling project can obtain input data, pass the input data to a scheduling engine, which can produce schedule, and receive the schedule data from the scheduling engine.

There can be one or more instances of a project type. For example, there can be two project instances of the shared project type, 'Collect_Infrequently' and "Collect_Frequently." When Collect_Infrequently is executed, it collects data when certain database records change and the collected data can be shared with other projects. When Collect_Frequently is executed, it collects data every five minutes and the collected data can be shared with other projects.

The service management system 201 can include a project user interface (UI) 209, project properties 211, a query module 213, configuration data 215, project results 225, a result publisher 217, an event listener 219, a workflow manager 221, and a repair module 223. This division of functionality is presented by way of example for sake of clarity. One skilled in the art would understand that the functionality described could be combined into a monolithic component or subdivided into any combination of components. In one embodiment, the project properties 211, the configuration data 215, and the project results 225 are stored in the persistent storage unit 203.

The service management system 201 can configure and manage one or more projects, each of which represents a phase of generating a manufacturing service result (e.g., prediction, schedule). The service management system 201 can provide a UI 209 to receive user input, such as from as process engineer, facility administrator, etc., to create and configure projects for generating manufacturing service results. The UI 209 can be a graphical user interface (GUI).

The service management system 201 can receive user input via the UI 209 that defines one or more properties 211 for each operation specified in the projects. A project can include project items, such as when a project runs, operations to be performed, where the project obtains its data from, what manufacturing service results to generate, etc. Project items have project properties 211. Examples of project properties 211 can include, and are not limited to, the steps of an operation, the order of the operations for the project, time horizons, sources systems to which data queries are submitted, characteristics of the data queries, and how service results (e.g., predictions, schedules) should be generated (e.g., using simulation, forecasting, statistical prediction, trend analysis, machine learning, or calculations). Project properties 211 can also include entities for which a service result (e.g., prediction, schedule) should be generated (e.g., equipment, product, operators, resources, etc.), and a trigger for initiating the service process (e.g., an event, a scheduled time or user request). Exemplary UIs are described in greater detail below in conjunction with FIGS. 7A and 7B.

The service management system 201 can receive input from a subscriber of a service (e.g., prediction service, scheduling service) that specifies project properties 211, such as subscription preferences. For example, a subscriber may identify entities for which predictions should be generated, a time horizon for generating predictions, conditions for receiving predictions (e.g., generation of new predictions, repair of existing predictions, etc.).

The service management system 201 can provide a template project that can be modified by a user, for example, via the UI 209. In particular, a user can delete some operations from the template project, add new operations, or modify some operations or their properties. The resulting project, as defined by the project properties 211, can be stored in a repository in the persistent storage unit 203 and can be retrieved by a user that may want to view or modify the project. The repository can represent any type of data storage, including, for example, relational or hierarchical databases (proprietary or commercial), flat files, application or shared memory, etc. A database may represent any type of data storage including, for example, relational or hierarchical databases, flat files, application or shared memory, etc.

A project can include data collection operations. The service management system 201 can receive input specifying project properties 211 for data collection, such as parameters for queries to be made to data source systems. The input can be user input received via the UI 209. For example, the service management system 201 may receive input specifying the source systems (e.g., source systems 104 in FIG. 1) to be queried for data, type of data to be collected, query filter information, etc. The data may be collected using for example, SQL queries, APF reports, workflow jobs, or may be collected from a previously executed project. In one embodiment, the service management system 201 can receive input for building the query from scratch. In another embodiment, the system 201 can provide a pre-generated template query and receive input that modifies a template query, for example, user input based on desired source systems and data to be collected from these source systems.

The service management system 201 can include a query module 213 to submit queries to the various source systems to obtain the data. The resulting queries can be stored in the persistent storage unit 203 and the service management system 201 can retrieve the stored queries to allow a user to view or modify the queries.

The service management system 201 can be coupled to one or more execution engines (e.g., prediction engine 205, schedule engine 207). An execution engine 205,207 can receive input data, process the input data, and generate an engine result. For example, the prediction engine 205 can generate a prediction of the state of a manufacturing facility, and the scheduling engine 207 can generate a manufacturing schedule. An execution engine 205,207 has associated configuration data 215 that can define an input schema, output schema, configuration options, and other information needed to execute an engine. The configuration data 215 allows engines 205,207 to be changed and upgraded without changing the prediction and scheduling server 200. The configuration data 215 also allows a third party to provide an engine 205,207. A third party is a third party to a developer of the service management system 201 (e.g., customer that purchased the service management system). In one embodiment, an execution engine 205,207 is a default engine provided by the developer of the service management system 201. In another embodiment, an execution engine 205,207 is third party engine, which may be provided by a third party. The service management system 201 can use the configuration data 215 to integrate with a third party engine 205,207. The configuration data 215 may be a configuration file. The configuration data 215 may be user-defined. For example, a third party may provide an execution engine and a configuration file that defines the input schema and output schema for the data to be processed.

Examples of input data for an execution engine 205,207 can include data that is collected by the query module 213 and project results 225 from executing a project. Project results 225 can include manufacturing service results (e.g., predictions, schedules, etc.). For example, the prediction engine 205 generates a prediction, and the scheduling engine 207 can use the prediction as input data to a generate schedule. Before an execution engine 205,207 can process the input data, the input data may need to satisfy a certain input schema. The input data may have a data schema that differs from the one in the configuration data 215 for an execution engine 205,207. For example, the query module 213 can collect raw data from a source system, and the source systems have a data schema that differs from the input schema for an execution engine 205,207.

The query module 213 can manipulate the input data, such as the query results (data collected from the source systems), according to the input schema in the configuration data 215 to allow the execution engine 205,207 to process the data. In one embodiment, the service management system 201 receives user input that specifies how the transformation is to be performed (e.g., by using an APF report or workflow). The query module 213 can receive query results from a source system and can transform the query results into a proper data format based on the input schema defined by the configuration data 215. Each execution engine can have corresponding configuration data 215. For example, the prediction engine 205 may have corresponding configuration data (not shown) and the scheduling engine 207 may have corresponding configuration data (not shown).

Execution of a project can generate project results 225. Examples of project results 225 can include, and are not limited to, data collected by a data collection project (e.g., query results from querying source systems), a prediction generated by a prediction project, a schedule generated by a scheduling project, etc. A project can run many times and generate many project results 225. The project results 225 can include the manufacturing service results. For example, one or more recipient systems request a manufacturing schedule for the manufacturing facility and a scheduling project generates a manufacturing schedule, which is stored as part of the project results 225.

The project results 225, including the manufacturing service results, can be available to other systems. For example, schedules can be published to external systems, published to external systems when data and/or results have changed, retrieved by systems using, for example, web services. The service management system 201 can manage when to publish the manufacturing service results and where to publish the manufacturing service results as specified by the project properties 211. For example, the service management system 201 can provide the schedule to a recipient system, such as a dispatcher, each time a new schedule is generated. A result publisher 217 can obtain the project results 225 (e.g., predictions, schedules) from the persistent storage unit 203 and send the project results 225 to one or more recipient systems (e.g., recipient systems 106 in FIG. 1). In one embodiment, the result publisher 217 sends results upon receiving a request from a recipient system. In another embodiment, the result publisher 217 allows users or systems to subscribe for services (e.g., prediction services, scheduling services), and provides project results to the subscribers periodically or when new results are generated or existing results are modified.

A project can be configured to start in various ways. An event listener 219 can detect a trigger for the execution of a project. One example of a trigger is the completion of another project. For example, a scheduling project can be executed when a prediction project ends. Other examples of triggers to initiate the execution of a project can include, and are not limited to, in response to a predetermined event (e.g., an APF repository event, the completion of another project), a scheduled time, a fixed time interval (e.g., every five minutes), in response to an external signal (e.g., a database trigger), in response to a trigger generated by an external system (e.g., a trigger passed by an external system to the server using HTTP, web services or other methods), and in response to a request from a user. A project can be configured to start using more than one trigger. For example, a user can configure a scheduling project to run every 5 minutes, but the first execution of the scheduling project may be triggered upon the completion of a prediction project. Thus, the scheduling project cannot start until the prediction project is complete.

A project can be a full service project or a service repair project. A full service project can generate manufacturing service results. A service repair project can perform incremental updates to the generated service results data in-between providing the full service results. A service repair project can be triggered by detection of a critical event. Examples of critical events can include, and are not limited to, a piece of equipment entering a down-time state, a piece of equipment stopping functioning properly, a lot of wafers being put on hold, etc. A critical event can be a user-defined event. A repair module 223 can monitor for an occurrence of a critical event and the service management system 201 can start a service update upon detecting a critical event. A repair module 223 can receive a notification from a source system indicated occurrence of critical event. The repair module 223 can repair the existing project results 225 relating to the critical event as specified by the project properties 211. For example, the repair module 223 may update predictions that are stored in the persistent storage unit 203 using simple calculations, or alternatively the repair module 223 may invoke the prediction engine 205 to generate new predictions.

One embodiment of a method for repairing existing manufacturing service results is described in greater detail below in conjunction with FIG. 4.

The service management system 201 can receive input to configure a project to include one or more workflows to trigger upon detecting an occurrence of an event during the execution of the project. The input can be user input received via UI 209. An event listener 219 can monitor for and detect the occurrence of a specified event. Examples of events can include, and are not limited to, an error in executing a project, completion of a project, etc. An event can be a user-defined event. For example, the event listener 219 detects an error in executing a project. A workflow can be associated with the error event and the workflow can be configured to send a notification (e.g., an e-mail) to a manager. In another example, the event listener 219 detects the completion of a project. A workflow that is associated with the completion event is configured to send the results of the project to an external system. A workflow manager 221 can associate the event with a workflow that is to be executed when the event is detected.

The query module 213, the result publisher 217, the event listener 219, the workflow manager 221, and the repair module 223 can comprise instructions stored in memory 904 that cause a processing device 902 in FIG. 9 described in greater detail below to perform the functions of the query module 213, the result publisher 217, the event listener 219, the workflow manager 221, and the repair module 223.

Figure 3:
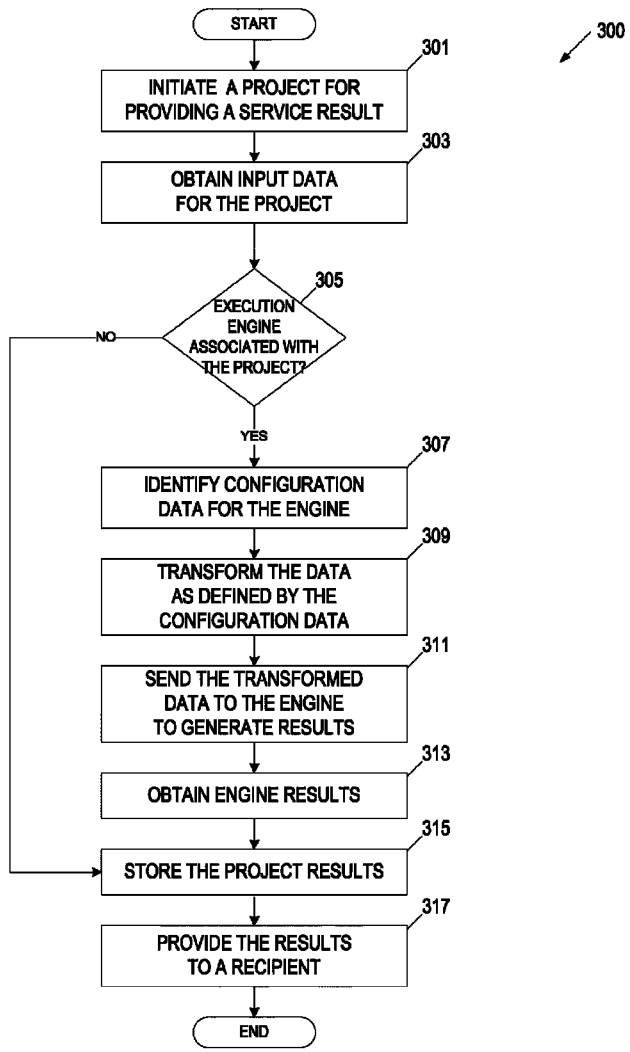
FIG. 3 is a flow diagram of one embodiment of a method for providing service results for a manufacturing facility.

FIG. 3 is a flow diagram of one embodiment of a method 300 for providing a service result (e.g., prediction, schedule). The method may be performed by processing logic that may comprise hardware (e.g., circuitry, dedicated logic, etc.), software (such as run on a general purpose computer system or a dedicated machine), or a combination of both. In one embodiment, processing logic resides in a prediction and scheduling server 101 of FIG. 1.

In one embodiment, a prediction and scheduling server is coupled to a persistent storage unit that stores projects pertaining to providing manufacturing service results. The prediction and scheduling server can create and maintain the projects, for example, based on user input. For instance, one or more recipient systems may have requested a manufacturing schedule for the manufacturing facility. The server can be configured with four projects for providing the manufacturing schedule. There are two instances of a shared project type: Collect_Infrequently and Collect_Frequently, and two instances of a service project type: PredictionProject and ScheduleProject. One of the projects generates the desired manufacturing service results. For example, the ScheduleProject generates the requested manufacturing schedule.

At block 301, processing logic can begin with initiating a project pertaining to providing a manufacturing service result (e.g., to collect data, to generate a prediction, to generate a schedule). Processing logic can initiate a project upon detecting a trigger, such as at a scheduled time, upon a user request, or upon an occurrence of a predefined event (e.g., completion of another project).

At block 303, processing logic obtains input data for the project as specified by the project properties. Processing logic can obtain input data from source systems and/or from data stored in a repository (e.g., project results of a previously executed project). A project may not require input data and processing logic does not obtain input data at block 303. For example, the project may be a shared project to collect data.

At block 305, processing logic can examine the project properties to determine whether there is an execution engine that is associated with the project. If there is not an execution engine associated with the project, the method continues to block 315 to store the results data from executing the project. For example, the project may be a data collection project (shared project), which is not associated with a particular execution engine to collect data. The data collection project itself can submit queries to source systems to collect data. The data may be collected using for example, SQL queries, APF reports, workflow jobs, etc. If there is an execution engine that is associated with the project, processing logic can identify the configuration data that corresponds to the execution engine at block 307. Processing logic can examine configuration data that is stored in a repository to identify the configuration data that corresponds to the execution engine. The configuration data can define an input schema, output schema, configuration options, and other information needed to execute an engine.

At block 309, processing logic manipulates the input data according to configuration data to allow an execution engine to process the input data. In one embodiment, processing logic receives user input that specifies how the transformation is to be performed (e.g., by using an APF report or workflow). At block 311, processing logic sends the transformed input data to the execution engine for the engine to process and generate project results (e.g., predictions, schedules). In one embodiment, an execution engine calculates results using one or more formulas. For example, a prediction engine can process the transformed data to generate predictions by making calculations, forecasting, statistical prediction, trend analysis, machine learning, running simulation, or using any other technique.

At block 313, processing logic obtains the project results from the engine and stores the project results at block 315. The project results can be stored in a repository, such as a database. For example, processing logic can store query results, data that has been transformed according to configuration data, predictions that have been generated by a prediction engine, schedules that have generated by a scheduling engine, published predictions, published schedules, etc.

The project results can be used to respond to a request for manufacturing service results. For example, one or more recipient systems may request a manufacturing schedule for the manufacturing facility and processing logic can send a schedule that is stored as part of the project results to the recipient systems. At block 317, processing logic can provide the requested service results to the one or more recipient systems. For example, processing logic can store the manufacturing service results in a data store and external entities can request the stored manufacturing service results. In another example, processing logic can send the results to one or more recipients as specified by the project properties. Processing logic may transform the results into a format that allows the results to be published to the recipient systems.

In one example, method 300 initiates a scheduling project to generate a manufacturing schedule. The ScheduleProject may be configured to run upon completion of a PredictionProject, and processing logic can initiate the ScheduleProject upon detecting the completion of the PredictionProject at block 301. At block 303, processing logic obtains the prediction generated by the PredictionProject, and data collected by Collect_Frequently and Collect_Infrequently, to use as input data for the ScheduleProject. At block 305, processing logic examines the ScheduleProject project properties and determines that a scheduling engine is associated with the ScheduleProject. At block 307, processing logic identifies the configuration data that corresponds to the scheduling engine and manipulates the input data according to configuration data to allow the scheduling engine to process the input data at block 311. At block 313, processing logic obtains the project results, such as the manufacturing schedule, from the scheduling engine and stores the schedule at block 315. At block 317, processing logic can transform a schedule generated by a scheduling engine into a format to be published for a dispatching system.

In another example, the method 300 initiates a shared project to collect data from source systems to be used in providing a manufacturing service result. For example, the project may be a Collect_Frequently project that is configured to run every 5 minutes, and processing logic can initiate the Collect_Frequently project every 5 minutes at block 301. The processing logic does not obtain input data for a shared project at block 303 and determines that there is not an execution engine associated with the shared project at block 305. At block 315, process logic stores the project results from initiating the shared project. When initiated, a shared project can submit queries to source systems to obtain data. In one embodiment, the queries are created on the fly. Alternatively, the queries are predetermined for each source system used to collect data. The queries may be specified by a user or be created automatically based on the data needed for a project. Processing logic receives query results from the source systems and stores the query results at block 315. The results can be used by other projects. If a recipient has requested the query results, processing logic can provide the query results to the recipient at block 317.

In another example, method 300 initiates a prediction project to generate a prediction about the future state of a manufacturing facility. The PredictionProject may be triggered to execute upon detecting the completion of either the Collect_Frequently project or Collect_Infrequently project, and processing logic can initiate the PredictionProject upon detecting the completion of either at block 301. At block 303, processing logic obtains the data collected by Collect_Frequently and Collect_Infrequently as input data for the PredictionProject. At block 305, processing logic examines the PredictionProject project properties and determines that a prediction engine is associated with the PredictionProject. At block 307, processing logic identifies the configuration data that corresponds to the prediction engine and manipulates the input data according to configuration data to allow the prediction engine to process the input data at block 311. The prediction engine can make calculations using information on the process equipment that can process a lot of material, the number of pieces in the lot, and the average process time per piece. In particular, the prediction execution engine can calculate the amount of processing time required on the equipment. In addition, if a lot started processing at some time in the past, the prediction execution engine can estimate the completion time, by knowing when processing had started. In another embodiment, the prediction execution engine uses simulation to generate predictions. In yet other embodiments, the prediction execution engine can generate predictions using forecasting, statistical prediction, trend analysis, machine learning, or other mechanisms. At block 313, processing logic obtains the project results, such as the prediction, from the prediction engine and stores the prediction at block 315. The results can be used by other projects. If a recipient has requested the prediction, processing logic can provide the prediction to the recipient at block 317.

In one embodiment, when an engine executes, processing logic can store the engine inputs, outputs, log files, etc. in the repository for later analysis. The data can allow a user to later reproduce errors that may be associated with the engine to be later reproduced and to allow later experimentation with engine parameters, e.g., tuning of objective function weights.

The repository may then be accessed to provide results (e.g., predictions, schedules) to subscribers of services or any other qualified recipients of prediction information. This data may be persisted in a commercial database, a custom database, a flat file, and/or stored in application memory.

Figure 4:
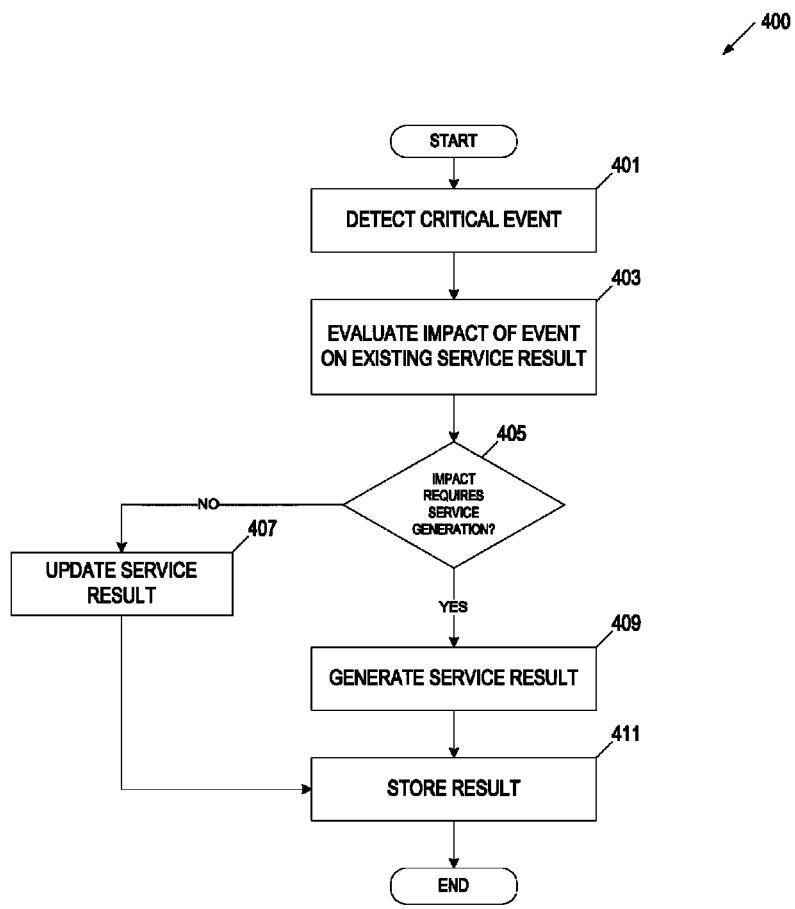
FIG. 4 is a flow diagram of one embodiment of a method for repairing existing service results.

FIG. 4 is a flow diagram of one embodiment of a method 400 for repairing existing service results (e.g., predictions, schedules). The method may be performed by processing logic that may comprise hardware (e.g., circuitry, dedicated logic, etc.), software (such as run on a general purpose computer system or a dedicated machine), or a combination of both. In one embodiment, processing logic resides in a prediction and scheduling server 101 of FIG. 1.

At block 401, processing logic can begin with detecting a critical event. The critical event may be detected upon receiving a notification from a source system. For example, a source system can be configured to provide notifications to the prediction and scheduling server each time processing of a lot of wafers is put on hold, a piece of equipment enters a downtime state or stops functioning properly, etc.

At block 403, processing logic evaluates the impact of the critical event on the existing service results (e.g., predictions, schedules). In one embodiment, processing logic sends a query for details regarding the critical event to the relevant source system. For example, if processing logic detects that processing of a specific lot of wafers in the MES is put on hold, processing logic may send a query to the MES to obtain all information about the specific lot. If the result of the query indicates that a problem which caused the interruption will be fixed during a specific time interval, processing logic may decide that complete regeneration of the existing service results (e.g., predictions, schedules) is not needed (block 405), and may repair the service result by updating only the result data affected by this event (block 407) and storing the updated data in the repository (block 411). The update may be made using simple calculations or filters. For example, processing logic may sense that a lot has violated a time sensitive operation, and then filter the lot from the prediction result. In another example, if a piece of equipment enters a downstate, processing logic can determine when the equipment will enter a productive state and will complete processing of the respective material based on the type of the downtime event and an estimate for the repair of the equipment. Alternatively, if the impact of the event on the current result (e.g., prediction, schedule) is significant (e.g., it causes a change in a large portion of operations to be performed), processing logic can regenerates the results (e.g., predictions, schedules) using simulation or calculations (block 409), and stores the new results (e.g., predictions, schedules) in the repository (block 411).

Figure 5:
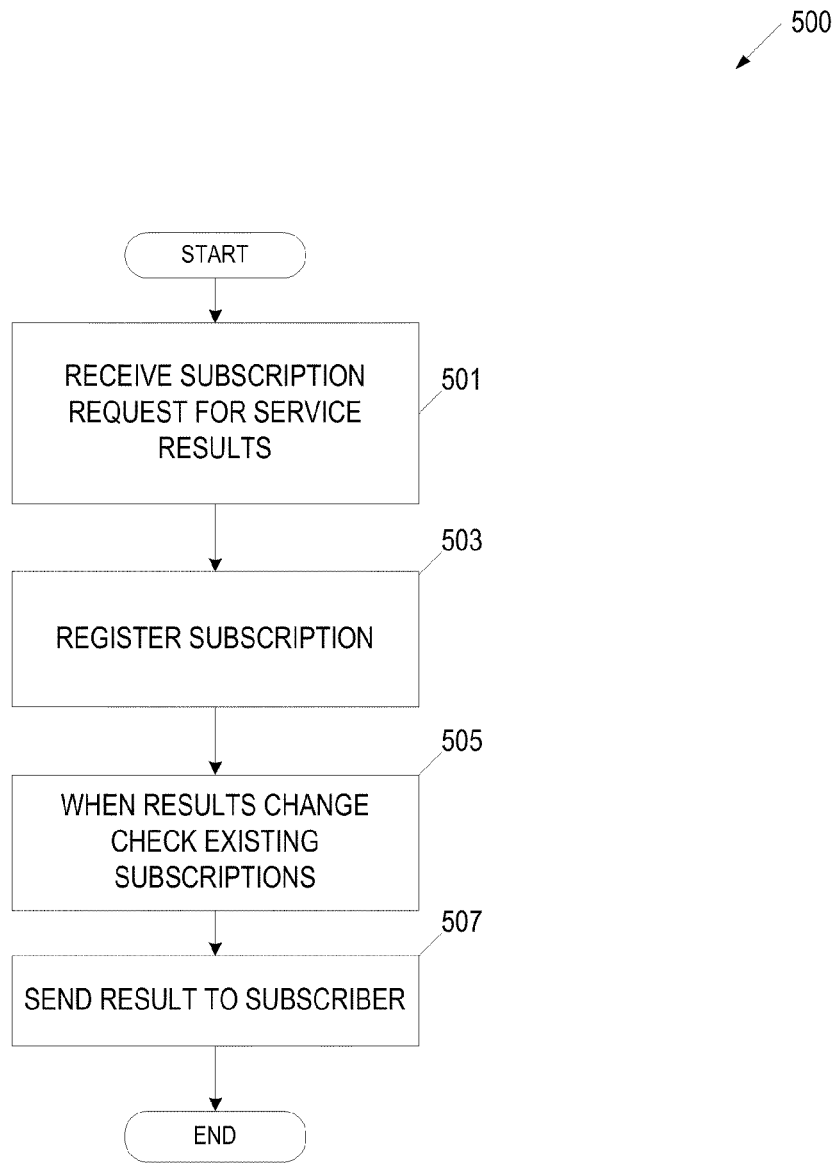
FIG. 5 is a flow diagram of one embodiment of a method for providing subscription services to subscribers.

FIG. 5 is a flow diagram of one embodiment of a method 500 for providing subscription services to subscribers. The method may be performed by processing logic that may comprise hardware (e.g., circuitry, dedicated logic, etc.), software (such as run on a general purpose computer system or a dedicated machine), or a combination of both. In one embodiment, processing logic resides in a prediction and scheduling server 101 of FIG. 1.

At block 501, processing logic begins with receiving a request to subscribe for services (e.g., prediction services, scheduling services). The request can be from a recipient system, a user, etc. The request may include parameters for generating services. For example, for prediction services, the request may include parameters that include, but are not limited to, time horizon, and entities of interest such as equipment or product. At block 503, processing logic registers the subscription request in a subscription database. Subsequently, when results change (e.g., due to repair or generation of new prediction), processing logic checks existing subscriptions to find subscribers that are interested in the new results (e.g., prediction, schedule) (block 505) and sends the new results to those subscribers (block 507). It should be noted that blocks 505 and 507 can be repeated multiple times in response to service updates, while blocks 501 and 503 may be performed only once per subscription.

Figure 6:
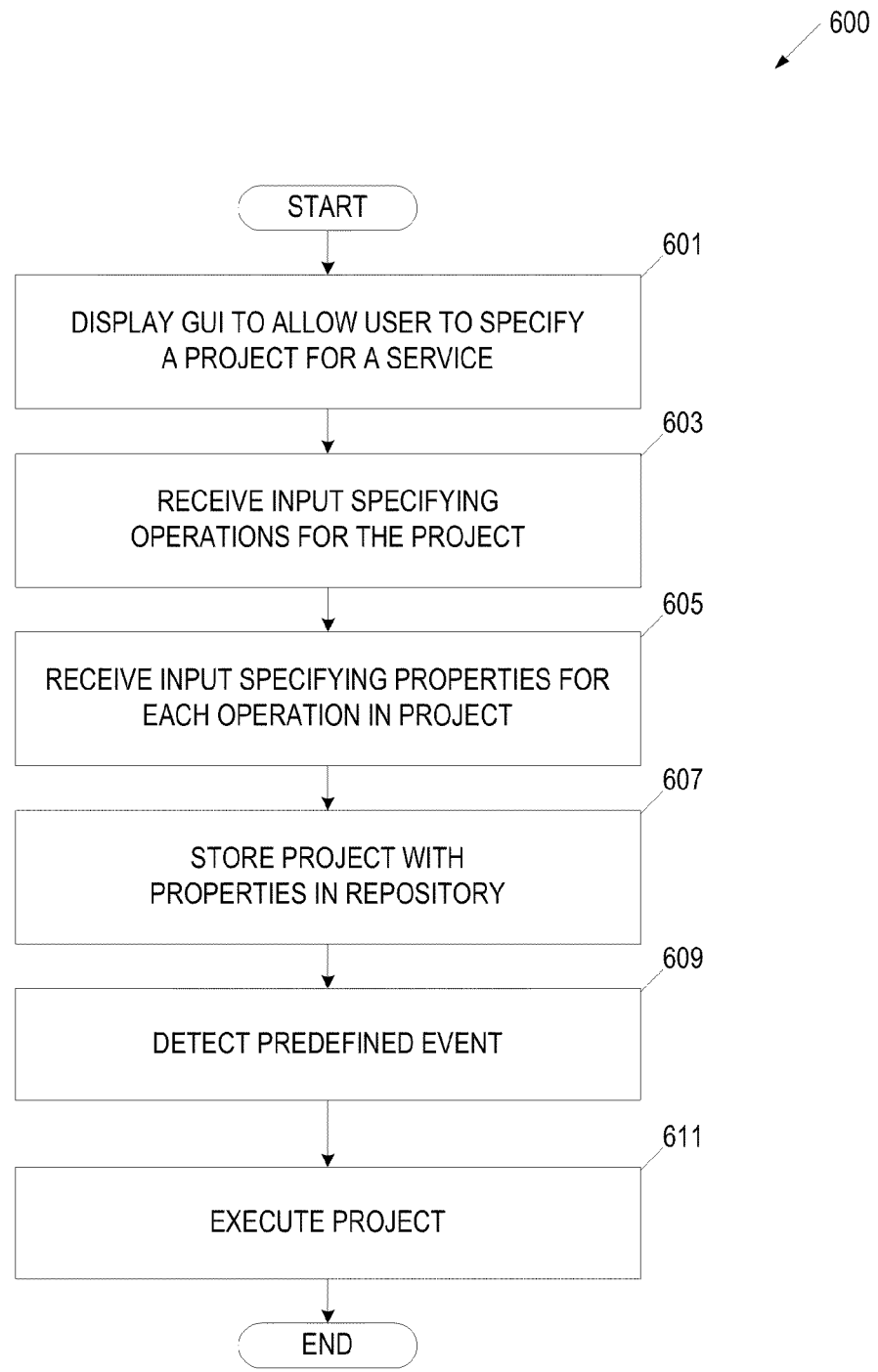
FIG. 6 is a flow diagram of one embodiment of a method for facilitating user-specified configuration of services in an automated manufacturing facility.

FIG. 6 is a flow diagram of one embodiment of a method 600 for facilitating user-specified configuration of services in an automated manufacturing facility. The method may be performed by processing logic that may comprise hardware (e.g., circuitry, dedicated logic, etc.), software (such as run on a general purpose computer system or a dedicated machine), or a combination of both. In one embodiment, processing logic resides in a prediction and scheduling server 101 of FIG. 1.

At block 601, processing logic begins with displaying a project user interface (UI) that allows a user to create a project or select an existing project for providing a service (e.g., providing a prediction, providing a schedule). The project UI can be a graphical user interface (GUI). A project includes a sequence of operations, which can be presented in the UI. Exemplary UIs are described in greater detail below in conjunction with FIGS. 7A and 7B.

At block 603, processing logic receives input specifying operations and an order of operations for the project. Processing logic can receive a user selection of the operations and order of operations for the project via the GUI. The project may be a shared project (e.g., a data collection project), a full service project, or a repair service project. For example, the operations included in a full project for a scheduling service may involve initiating the full scheduling project, collecting data about the manufacturing facility, generating a scheduling based on the collected data, and making the schedule available to requestors (e.g., a recipient system such as a dispatcher). In another example, the operations included in a repair project for the scheduling service may involve detecting a critical event, evaluating the impact of the critical event on the existing schedule, and updating the existing scheduling data according to the impact of the critical event.

At block 605, processing logic receives input specifying properties for operations included in the project. Processing logic can receive input via the GUI. For instance, for a scheduling project, the properties may include, for example, a time horizon (e.g., a time interval for creating a schedule), a project trigger, data source systems, query parameters, facility areas for which a schedule is created, entities in the facility areas that are being scheduled, a schedule search time (a time interval during which the best scheduling solution should be found), a schedule optimization goal function (e.g., multiple factors of any factory performance metric such as least cycle time, most throughput, least work in progress, etc.), etc. At block 607, processing logic stores the project with the properties in a repository as part of the project data for the project.

Subsequently, at runtime, processing logic detects a predefined event at block 609 and executes the project at block 611. A predefined event may be a user request (manual initiation) to execute the project, a specific time, completion of another project, a critical event occurred in the manufacturing facility (e.g., unexpected downtime of equipment), etc. In one embodiment, a project and the project properties are already stored in a repository, and processing logic begins method 600 by detecting a predefined event at block 609. Processing logic can repeat detecting a predefined event at block 609 and executing the project at block 611 many times for a stored project.

Figure 7A:
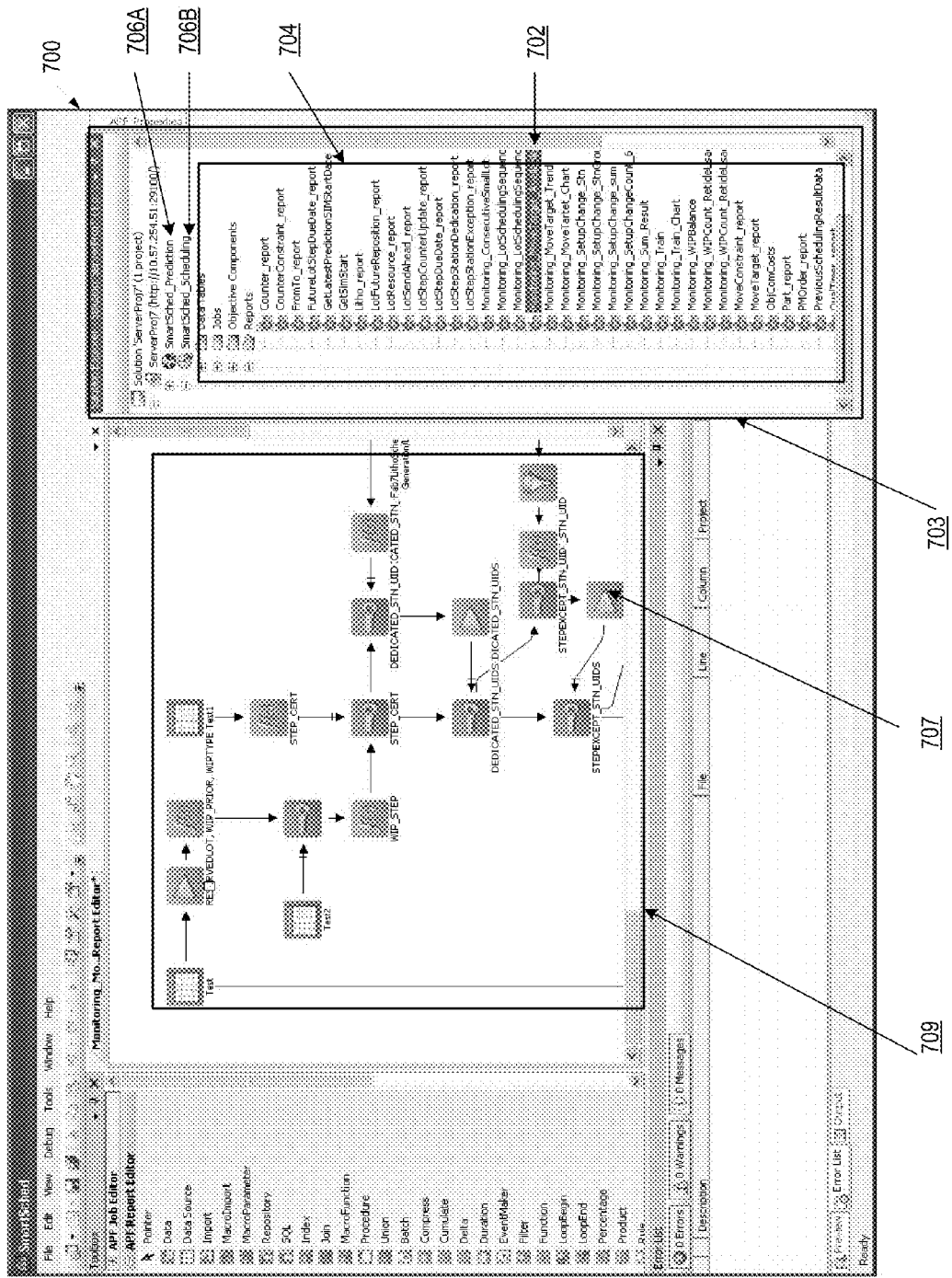
FIG. 7A illustrates an exemplary project graphical user interface, in accordance with one embodiment of the invention.
Figure 7B:
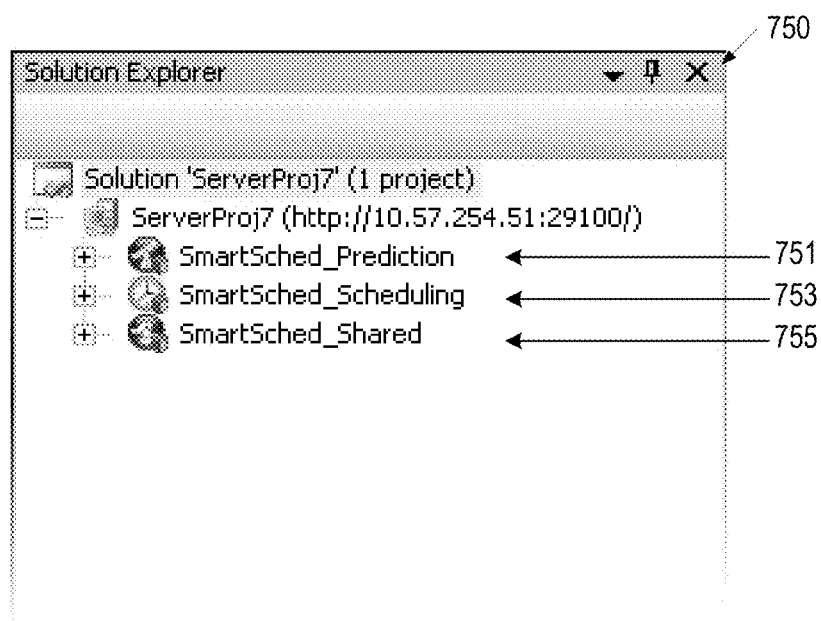
FIG. 7B illustrates an exemplary project graphical user interface, in accordance with one embodiment of the invention.

FIG. 7A illustrates an exemplary project GUI 700. Project GUI 700 can include solution GUI 703 that provides access to the projects 706A,B and project items 704. FIG. 7B illustrates an exemplary solution GUI 750 displaying three projects: a prediction project 751, a scheduling project 753, and a shared project 755. Returning to FIG. 7A, solution GUI 703 shows two projects: a prediction project 706A and a scheduling project 706B, and the project items 704 for the scheduling project 706B. GUI 700 can include an active item GUI 709 that displays operations relating to a project item and properties of a project item that is selected from the solution GUI 703. For example, a user selected project item 702 in solution GUI 703 and the active item GUI 709 displays the operation and properties of the project item 702. The project GUI 709 can present the operations using operation indicators that visually illustrate the functionality associated with the operations (e.g., using symbols, images, shapes, color, size, labels, etc.). The GUI 709 also graphically illustrates the order for the executing the operations (e.g., using arrows or other visual indicators).

In one embodiment, the active item GUI 709 allows a user to specify properties for each operation included in the project. In particular, upon a user request, the project GUI 709 may present a window (not shown) with a form containing one or more property fields for a specific operation. A user request for a property form may be generated, for example, when a user double clicks an operation indicator, right clicks an operation indicator, selects a property option, etc. The properties may include, for example, a time horizon (e.g., a time interval for creating a schedule), a workflow trigger, data source systems, query parameters, facility areas for which a schedule is created, entities in the facility areas that are being scheduled, a schedule search time (a time interval during which the best scheduling solution should be found), a schedule optimization objective function (e.g., multiple factors of any factory performance metric such as least cycle time, most throughput, least work in progress, etc.), etc.

Figure 8:
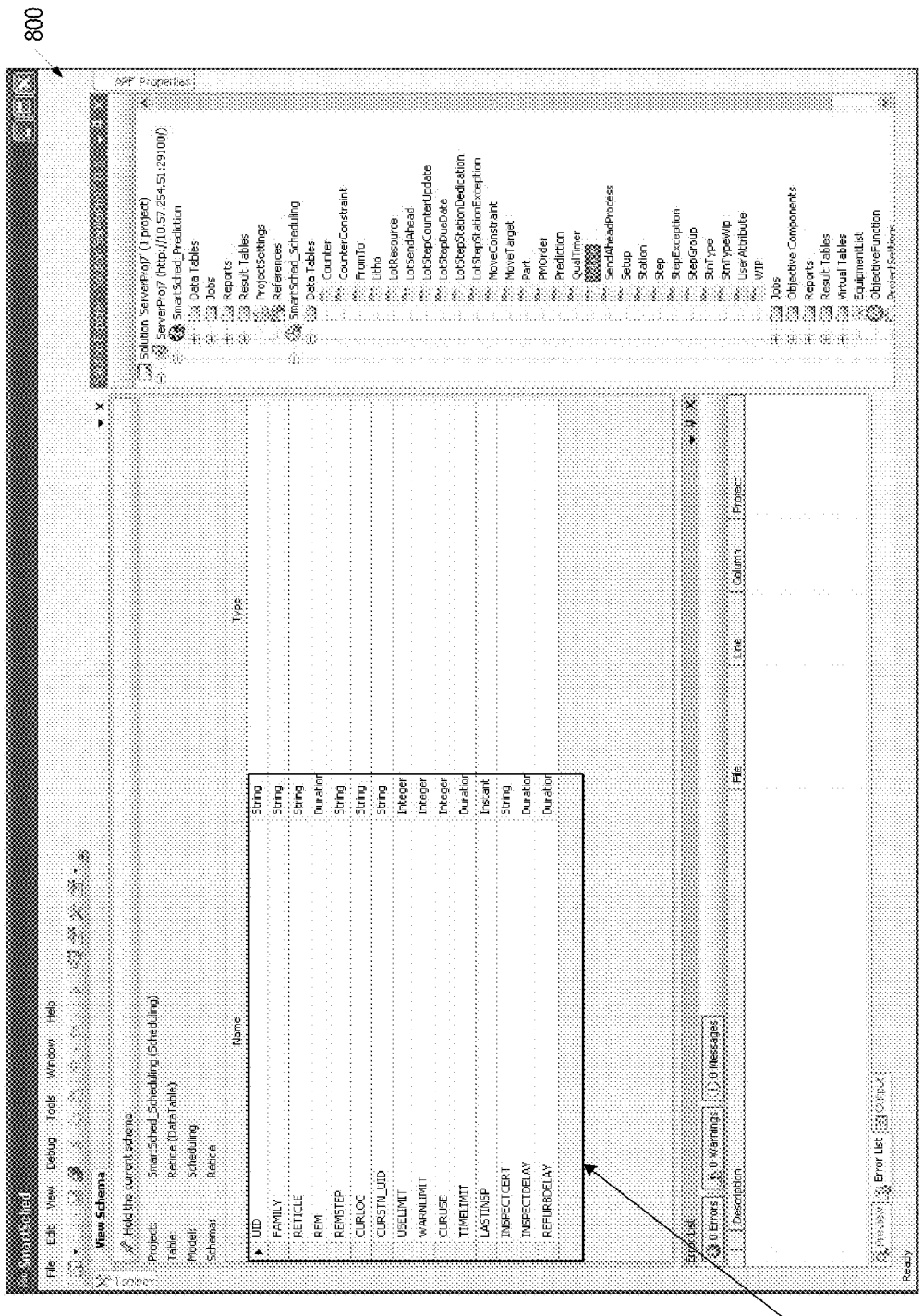
FIG. 8 illustrates an exemplary project GUI that displays a data schema, in accordance with one embodiment of the invention.

FIG. 8 illustrates an exemplary project GUI 800 that displays data schema 805 corresponding to a scheduling engine, in accordance with one embodiment of the invention. The data schema 805 may be an XML schema or any other type of schema. The data schema 805 may be a configuration file. The configuration file may be provided by a user. The configuration file allows an execution engine to be changed and upgrades without changing the prediction and scheduling server. In one embodiment, processing logic transforms the data into a format defined by configuration data when processing logic obtains data for the project at block 803.

Figure 9:
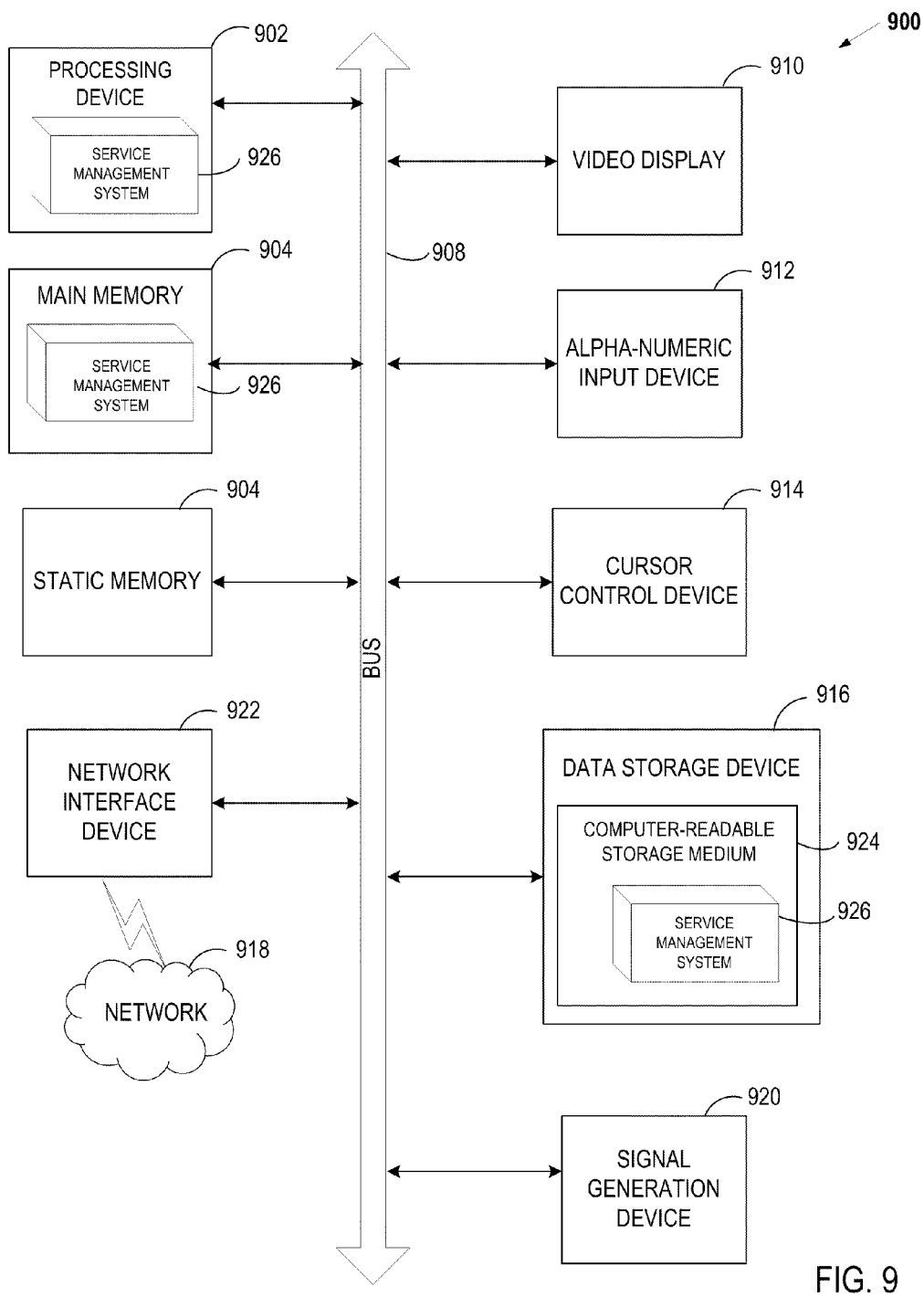
FIG. 9 illustrates a diagrammatic representation of a machine in the exemplary form of a computer system, in accordance with one embodiment of the present invention.

FIG. 9 is a diagram of one embodiment of a computer system for configuring and managing manufacturing services. Within the computer system 900 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer executing the browser and the server computer executing the automated task delegation and project management) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 900 includes a processing device 902, a main memory 904 (e.g., read-only memory (ROM), flash memory, dynamic random access memory (DRAM) such as synchronous DRAM (SDRAM) or DRAM (RDRAM), etc.), a static memory 906 (e.g., flash memory, static random access memory (SRAM), etc.), and a secondary memory 916 (e.g., a data storage device in the form of a drive unit, which may include fixed or removable computer-readable storage medium), which communicate with each other via a bus 908.

Processing device 902 represents one or more general-purpose processing devices such as a microprocessor, central processing unit, or the like. More particularly, the processing device 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. Processing device 902 is configured to execute the service management system 926 for performing the operations and steps discussed herein.

The computer system 900 may further include a network interface device 922. The computer system 900 also may include a video display unit 910 (e.g., a liquid crystal display (LCD) or a cathode ray tube (CRT)) connected to the computer system through a graphics port and graphics chipset, an alphanumeric input device 912 (e.g., a keyboard), a cursor control device 914 (e.g., a mouse), and a signal generation device 920 (e.g., a speaker).

The secondary memory 916 may include a machine-readable storage medium (or more specifically a computer-readable storage medium) 924 on which is stored one or more sets of instructions (e.g., the service management system 926) embodying any one or more of the methodologies or functions described herein. The service management system 926 may also reside, completely or at least partially, within the main memory 904 and/or within the processing device 902 during execution thereof by the computer system 900, the main memory 904 and the processing device 902 also constituting machine-readable storage media. The service management system 926 may further be transmitted or received over a network 918 via the network interface device 922.

The computer-readable storage medium 924 may also be used to store the service management system 926 persistently. While the computer-readable storage medium 924 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The service management system 926, components and other features described herein (for example in relation to FIG. 1) can be implemented as discrete hardware components or integrated in the functionality of hardware components such as ASICS, FPGAs, DSPs or similar devices. In addition, the service management system 926 can be implemented as firmware or functional circuitry within hardware devices. Further, the service management system 926 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "initiating," "obtaining," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus can be specially constructed for the required purposes, or it can comprise a general purpose computer system specifically programmed by a computer program stored in the computer system. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems can be used with programs in accordance with the teachings herein, or it may prove convenient to construct a more specialized apparatus to perform the method steps. The structure for a variety of these systems will appear from the description below. In addition, embodiments of the present invention are not described with reference to any particular programming language. It will be appreciated that a variety of programming languages can be used to implement the teachings of embodiments of the invention as described herein.

A computer-readable storage medium can include any mechanism for storing information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only memory (EPROM), Electrically Erasable Programmable Read-Only Memory (EEPROM), magnetic or optical cards, flash memory, or the like.

Thus, a method and apparatus for managing services, such as prediction and scheduling services, and facilitating user-specified configuration of the services. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a server computing system programmed to perform the following, comprising:

maintaining, by the server computing system, a plurality of projects including at least one prediction project and at least one scheduling project with the plurality of projects pertaining to providing manufacturing service results, wherein each of the plurality of projects specifies one or more operations to be performed relating to providing the manufacturing service results, and wherein the at least one scheduling project generates a requested manufacturing schedule;

initiating, by the server computing system, the at least one project that generates the requested manufacturing schedule, wherein the at least one project is associated with an execution engine and initiating the at least one project comprises sending input data to the execution engine based on configuration data that is associated with the execution engine, and obtaining the requested manufacturing schedule from the execution engine; and providing, by the server computing system, the requested manufacturing schedule to at least one recipient.

2. The method of claim 1, wherein the plurality of projects comprises at least one of: a data collection project and a service project.

3. The method of claim 1, wherein initiating the at least one project that generates the requested manufacturing schedule comprises:

configuring a trigger for the at least one project to execute upon completion of at least one other project of the plurality of projects.

4. The method of claim 1, wherein sending the input data to the execution engine comprises:

obtaining the input data from at least one other project of the plurality of projects.

5. The method of claim 1, wherein the plurality of projects comprises at least one data collection project, a prediction project, and a scheduling project, and wherein the scheduling project generates the manufacturing schedule.

6. The method of claim 5, wherein the plurality of projects further comprises at least one of: a plurality of scheduling projects and a plurality of prediction projects, each project corresponding to an area of a manufacturing facility.

7. The method of claim 5, wherein initiating the at least one project that generates the requested manufacturing schedule comprises:

executing the prediction project in response to detecting execution of the at least one data collection project is complete, wherein executing the prediction project comprises using data collected by the at least one data collection project and generating prediction result data; and initiating the scheduling project to generate the requested manufacturing schedule in response to detecting the execution of the prediction project is complete, wherein initiating the scheduling project comprises using the data collected by the at least one data collection project and the prediction result data from the execution of the prediction project.

8. The method of claim 1, wherein the server computing system hosts a service management system and the execution engine is provided by a third party, wherein the third party is a third party to a developer of the service management system.

9. The method of claim 1, wherein the configuration data that is associated with the execution engine describes an input schema and an output schema for the execution engine.

10. The method of claim 1, wherein maintaining the plurality of projects comprises:
displaying a project user interface allowing a user to specify the plurality of projects for providing manufacturing service results;
receiving, via the project user interface, user input defining one or more properties for each operation identified in the plurality of projects; and
storing the plurality of projects with the properties in a persistent storage unit for subsequent execution in response to a project trigger.

11. A system comprising:
a persistent storage unit to store a plurality of projects including at least one prediction project and at least one scheduling project with the plurality of projects pertaining to providing manufacturing service results, wherein each of the plurality of projects specifies one or more operations to be performed relating to providing the manufacturing service results, and wherein the at least one scheduling project generates a requested manufacturing schedule; and
a processor coupled to the persistent storage unit to initiate the at least one project that generates the requested manufacturing schedule, and to provide the requested manufacturing schedule to at least one recipient, wherein the at least one project is associated with an execution engine and to initiate the at least one project comprises sending input data to the execution engine based on configuration data that is associated with the execution engine and obtaining the requested manufacturing schedule from the execution engine.

12. The system of claim 11, wherein to initiate the at least one project that generates the requested manufacturing schedule comprises the processor:
to configure a trigger for the at least one project to execute upon completion of at least one other project of the plurality of projects.

13. The system of claim 11, wherein to send the input data to the execution engine comprises the processor:
to obtain the input data from at least one other project of the plurality of projects.

14. The system of claim 11, wherein the plurality of projects comprises at least one data collection project, a prediction project, and a scheduling project, and wherein the scheduling project generates the manufacturing schedule.

15. The system of claim 14, wherein to initiate the at least one project comprises the processor:
to execute the prediction project in response to detecting the execution of the at least one data collection project is complete, wherein to execute the prediction project comprises the processor to use data collected by the at least one data collection project and to generate prediction result data; and
to initiate the scheduling project to generate the requested manufacturing service result in response to detecting the execution of the prediction project is complete, wherein to initiate the scheduling project comprises the processor to use the data collected by the at least one data collection project and the prediction result from the execution of the prediction project.

16. The system of claim 11, wherein the system hosts a service management system and the execution engine is provided by a third party, wherein the third party is a third party to a developer of the service management system.

17. The system of claim 11, wherein the configuration data that is associated with the execution engine describes an input schema and an output schema for the execution engine.

18. A computer-readable non-transitory storage medium including instructions that, when executed by a computer system, cause the computer system to perform a set of operations comprising:
maintaining a plurality of projects including at least one prediction project and at least one scheduling project with the plurality of projects pertaining to providing manufacturing service results, wherein each of the plurality of projects specifies one or more operations to be performed relating to providing the manufacturing service results, and wherein the at least one scheduling project generates a requested manufacturing schedule;
initiating the at least one project that generates the requested manufacturing schedule, wherein the at least one project is associated with an execution engine and initiating the at least one project comprises sending input data to the execution engine based on configuration data that is associated with the execution engine, and obtaining the requested manufacturing schedule from the execution engine; and
providing the requested manufacturing schedule to at least one recipient.

19. The computer-readable non-transitory storage medium of claim 18, wherein initiating the at least one project that generates the requested manufacturing schedule comprises:
configuring a trigger for the at least one project to execute upon completion of at least one other project of the plurality of projects.

20. The computer-readable non-transitory storage medium of claim 18, wherein sending the input data to the execution engine comprises:
obtaining the input data from at least one other project of the plurality of projects.

21. The computer-readable non-transitory storage medium of claim 18, wherein the plurality of projects comprising at least one data collection project, a prediction project, and a scheduling project, wherein the requested manufacturing schedule comprises a manufacturing schedule, and wherein initiating the project that generates the requested manufacturing schedule comprises:
executing the prediction project in response to detecting execution of the at least one data collection project is complete, wherein executing the prediction project comprises using data collected by the at least one data collection project and generating prediction result data; and
initiating the scheduling project to generate the requested manufacturing schedule in response to detecting the execution of the prediction project is complete, wherein initiating the scheduling project comprises using the data collected by the at least one data collection project and the prediction result data from the execution of the prediction project.

22. The computer-readable non-transitory storage medium of claim 18, wherein the computing system hosts a service management system and the execution engine is provided by a third party, wherein the third party is a third party to a developer of the service management system.

* * * * *